United States Patent
Carroll et al.

(10) Patent No.: US 6,301,707 B1
(45) Date of Patent: Oct. 9, 2001

(54) INSTALLING SOFTWARE BASED ON A PROFILE

(75) Inventors: Terri A. Carroll, Milford; Jacques E. Hasbani, Bethel; Kennett Karbowski, Farmington, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 08/942,265

(22) Filed: Sep. 30, 1997

(51) Int. Cl.[7] ....................................................... G06F 9/45
(52) U.S. Cl. ................................................................ 717/11
(58) Field of Search ........................ 717/11, 1; 707/103; 345/348; 709/221

(56) References Cited

U.S. PATENT DOCUMENTS

| | | | |
|---|---|---|---|
| 4,999,806 | 3/1991 | Chernow et al. | 717/11 |
| 5,247,683 * | 9/1993 | Holmes et al. | 717/1 |
| 5,293,310 | 3/1994 | Carroll et al. | 705/14 |
| 5,337,246 | 8/1994 | Carroll et al. | 705/402 |
| 5,421,009 | 5/1995 | Platt | 709/221 |
| 5,485,369 | 1/1996 | Nicholls et al. | 705/9 |
| 5,555,416 * | 9/1996 | Owens et al. | 717/1 |
| 5,604,906 * | 2/1997 | Murphy et al. | 717/11 |
| 5,631,827 | 5/1997 | Nicholls et al. | 705/28 |
| 5,666,501 * | 9/1997 | Jones et al. | 345/348 |
| 5,835,777 * | 11/1998 | Staelin | 717/11 |
| 5,845,090 * | 12/1998 | Collins, III et al. | 717/11 |
| 5,860,012 * | 1/1999 | Luu | 717/11 |
| 5,881,236 * | 3/1999 | Dickey | 709/221 |
| 5,933,647 * | 8/1999 | Aronberg et al. | 717/11 |
| 5,963,743 * | 10/1999 | Amberg et al. | 717/11 |
| 6,012,065 * | 1/2000 | Boucher et al. | 707/103 |

* cited by examiner

*Primary Examiner*—Kakali Chaki
*Assistant Examiner*—Hoang-Vu Antony Nguyen-Ba
(74) *Attorney, Agent, or Firm*—Brian A. Lemm; Michael E. Melton

(57) ABSTRACT

A software system is selectively installed from a source into a target system according to a profile. The software system comprises a plurality of components. Only selected components are needed by the target system. A profile of the target system is created when the target system is defined; the profile defines the components needed by the target system. To configure the target system, an installation process installs in the target system only components from the source that are defined in the profile for the target system. The source may be a storage medium or a separate installation system.

33 Claims, 5 Drawing Sheets

INSTALLING SOFTWARE BASED ON A PROFILE

RELATED APPLICATIONS

Reference is made to application Ser. No. 08/942,209, entitled CARRIER MANAGER INTERFACE UTILIZING AN OCX CONTROL, assigned to the assignee of this application and filed on even date herewith.

Reference is made to application Ser. No. 08/942,263, entitled A METHOD AND SYSTEM FOR ACCESSING CARRIER DATA, now U.S. Pat. No. 6,012,065, assigned to the assignee of this application and filed on even date herewith.

Reference is made to application Ser. No. 08/942,264, entitled A METHOD AND SYSTEM FOR CHANGING RATING DATA VIA INTERNET OR MODEM IN A CARRIER MANAGEMENT SYSTEM, assigned to the assignee of this application and filed on even date herewith.

Reference is made to application Ser. No. 08/942,262, entitled A METHOD AND SYSTEM OF IMPLEMENTING A CARRIER MANAGER LIBRARIAN, now U.S. Pat. No. 6,078,889, assigned to the assignee of this application and filed on even date herewith.

Reference is made to application Ser. No. 08/942,260, entitled A METHOD AND SYSTEM OF IMPLEMENTING A CARRIER MANAGER REGISTRY, now U.S. Pat. No. 6,018,725, assigned to the assignee of this application and filed on even date herewith.

Reference is made to application Ser. No. 08/942,261, entitled EVENT INTERFACE FOR A CARRIER MANAGER SYSTEM, assigned to the assignee of this application and filed on even date herewith.

BACKGROUND OF THE INVENTION

1. Field of the Invention

The present invention relates generally to computer systems, and more particularly relates to automatically installing selected software components in a target computer system according to a profile of the target system.

2. Description of Related Art

Modem software systems often are organized as a core program that can access numerous secondary components such as drivers, libraries, modules, or files. In some systems, after the core program is installed and operating in a desired computer (called the "target system"), the core program does not need to access every component of the software system. Instead, the core program needs to access only selected components of the software system that relate to a particular applications, devices, or functions of the target system. However, in most of these software systems, all the components are installed in the target system because the particular applications or functions are not known in advance.

One known software system is used in connection with computer systems used by shippers for processing shipments of surface-carried packages, packages carried by air, and express packages destined to be carried to a remote destination by a carrier. For example, a high-volume shipper, such as a product distributor, has a computer system that includes a processor, a storage device, a label printer, and a document printer. Shipment management software runs on the computer system. The shipment management software maintains a database on the storage device containing the names and addresses of destinations that receive packages. When an outbound package is ready for shipment, a user of the software enters the destination into the database, or recalls it from the database if it has been entered previously. The user enters data identifying the carrier, method of delivery, package size and weight, and other information describing the shipment. The shipment management software prints a package label on the label printer; the package label contains the address, routing information such as bar codes, and other information used by the carrier to deliver the package to its destination. The shipment management software may also print documentation relating to the package on the document printer, such as an airbill, manifest, Customs declaration forms, or various reports.

Contemporary systems of this type are configured to operate in connection with numerous different carriers, each of whom has a different fee or rate structure. Exemplary carriers include the Roadway Express, United Parcel Service, Federal Express, DHL, etc.

Typically, the manufacturer of the shipment management software configures the shipper's computer system for the shipper, who buys or leases the computer system from the manufacturer. Thus, the shipper is a customer of the manufacturer, and the manufacturer builds the system to order of the customer. The shipment management software that runs on the shipper's computer is part of a software system including a set of carrier files. Each of the carrier files is uniquely associated with one of the carriers. The price of the computer system paid by the shipper to the manufacturer is determined, in part, by the number and identity of the carrier files needed or to be used by the shipper. When the manufacturer configures the computer for the shipper, the core program and all the carrier files are loaded onto the shipper's computer.

While the approach described above results in installation of the software system on the customer's computer, it has several significant disadvantages. For example, this approach installs all the components of the software system on the customer's computer, even though the customer may have paid for only a subset of the components. Thus, this approach creates the risk that the customer may be able to have unauthorized access to or use of certain components. It is desirable to install on the customer computer only those components that the customer has specifically ordered and paid for.

The approach described above also wastes computer resources. For example, the customer computer is loaded with numerous components that will never be used by the core program. This approach wastes time by carrying out file transfer operations or copying operations that are unnecessary. It is desirable to save installation time by installing only those components that are needed by the shipment management program.

Also, this approach unnecessarily uses valuable storage space on data storage devices in the customer computer. It is desirable to save data transmission time and storage space by installing only those carrier files that are needed by the shipment management program.

For all these reasons, there is a need for a method, apparatus and product that can selectively install components of a software system in a target system according to a profile of the target system, so that the target system receives only selected components that are identified in the profile.

SUMMARY OF THE INVENTION

The invention provides a method, apparatus, and computer program product for installing software based upon a profile. In one embodiment, a method of installing a software system in a target system from a source that stores a plurality of software components of the software system, comprises the steps of storing a profile of the target system, wherein the profile defines a subset of the software components that are needed by the target system; and installing, from the source to the target system, only the subset of the software components defined in the profile. In one aspect, the source is a computer readable medium. In another aspect, the source is an installation system.

One feature of the invention is that the step of installing further comprises communicating the subset from the installation system to the target system over a network. Another feature is that the step of storing a plurality of software components includes storing in the installation system a plurality of carrier files, wherein each of the carrier files defines shipment parameters for one of a plurality of carriers. Another feature is that storing a profile of the target system includes storing in the installation system a feed file comprising at least one product control number, wherein each the product control number uniquely identifies one of the carrier files.

In another aspect, the step of installing further comprises the steps of reading a selected product control number from the feed file; identifying one of the carrier files identified by the selected product control number; and copying from the installation system to the target system the one of the carrier files that is identified by the selected product control number. One feature of this aspect includes storing in the installation system a supported carrier list comprising a plurality of supported carrier identifiers. Another feature is that the step of identifying one of the carrier files includes the step of testing whether the selected product control number matches one of the supported carrier identifiers. According to another feature, each of the carrier files comprises a rating DLL. Still another feature is writing information identifying one of the carriers in a system registry of the target system.

The invention also encompasses a computer apparatus and a computer program product having the foregoing features and aspects.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

DETAILED DESCRIPTION OF THE PREFERRED EMBODIMENTS

A method, apparatus and computer program product for installing software based on a profile is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The detailed descriptions that follow may be presented in terms of program procedures, routines or processes executed on a computer or network of computers. These procedural descriptions and representations are the means used by those skilled in the art to most effectively convey the substance of their work to others skilled in the art.

A procedure, routine, or process is generally conceived to be a self-consistent sequence of steps leading to a desired result. These steps require physical manipulations of physical quantities. Usually, through not necessarily, these quantities take the form of electrical or magnetic signals capable of being stored, transferred, combined, compared, and otherwise manipulated. Principally for reasons of common usage, at times it is convenient to refer to these signals as bits, values, elements, symbols, characters, terms, numbers, or the like. It should be noted, however, that all of these and similar terms are associated with physical quantities and are merely convenient labels applied to such quantities.

Further, the manipulations performed are often referred to in terms, such as adding or comparing, which are commonly associated with mental operations performed by a human operator. No such capability of a human operator is necessary or desirable in most cases in any of the operations described herein that form part of the present invention; the operations are machine operations. Useful machines for performing the operation of the present invention include general-purpose digital computers or similar devices.

The present invention also relates to apparatus for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings described in this document, or it may prove more convenient to construct more specialized apparatus to perform the described method steps. The required structure for a variety of these machines will appear from the description given.

Figure 1A:
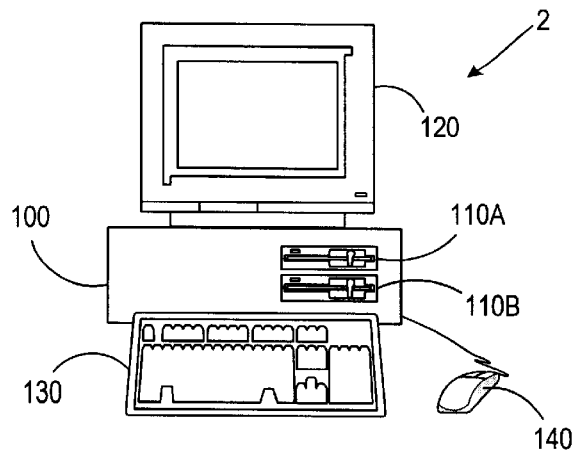
FIG. 1A illustrates a computer of a type suitable for carrying out the invention.

FIG. 1A illustrates a computer of a type suitable for carrying out the invention. Viewed externally in FIG. 1A, a computer 2 has a central processing unit 100 having disk drives 110A and 110B. Disk drive indications 110A and 110B are merely symbolic of a number of disk drives that might be accommodated by the computer 2. Typically, these would include a floppy disk drive such as 110A, a hard disk drive (not shown externally) and a CD ROM drive indicated by slot 110B. The number and type of drives varies, typically, with different computer configurations. The computer 2 has a display 120 upon which information is displayed. A keyboard 130 and a mouse 140 are typically also available as input devices. Preferably, the computer 2 illustrated in FIG. 1A is a personal computer.

Figure 1B:
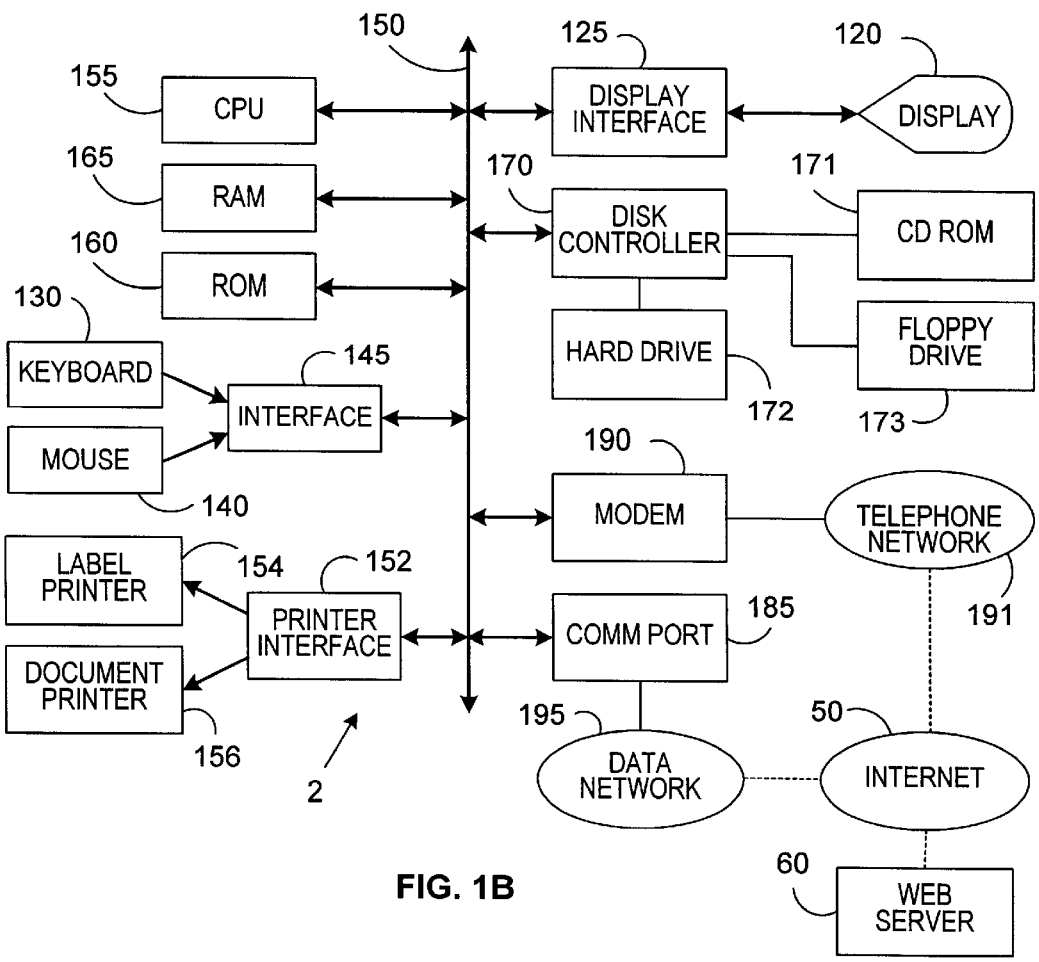
FIG. 1B is a block diagram of the computer of FIG. 1A.

FIG. 1B illustrates a block diagram of the internal hardware of the computer 2 of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the bus 150. These disk drives may be floppy disk drives, such as 173, internal or external hard drives, such as 172, or CD ROM or Digital Video Disk (DVD) drives such as 171. A display interface 125 interfaces a display 120 and permits information from the bus to be viewed on the display. A printer interface 152 interfaces the bus 150 to a label printer 154 and to a document printer 156, and permits information from the bus to be printed on the printers 154, 156.

A modem bank interface 190 is used if the computer is configured as a proxy or an Internet Service Provider (ISP). The modems of the modem bank 190 are connected to a telephone network 191 in the usual manner. Communications with a network 195 or with other external devices can occur over communications port 185.

In one embodiment, the data network 195 is coupled to a globally accessible computer network such as the Internet 50. Alternatively, the network 195 is a local area network. For example, using a modem bank 190 and telecommunications software, the computer can call an ISP and establish a dial-up connection to the Internet 50. A remote Web server 60 is connected to the network. The remote server 60 contains source documents, such as pages formatted in the HTML language, or websites referenced in a source document.

In conjunction with a shipment manager program, a computer 2 in this arrangement can be used for generating and managing package shipments and related documents. For example, the computer 2 runs the Ascent™ program that is commercially available from Pitney Bowes Inc. of Stamford, Conn. Using the Ascent program or another shipment manager, a user defines a database of destinations to be stored on the hard disk 172. The user enters data representing package recipients or destinations into the database. The user also enters data representing specific packages to be shipped to the destination as a part of a shipment. Using pre-defined functions and instructions, the user can instruct the shipment manager to select a carrier for the shipment, compute the cost of the shipment, and post the cost to an accounting software system. The user also can instruct the system to print shipment labels for the shipment on the label printer, and to print shipping documents for the shipment on the document printer. The label is manually applied to the packages in the shipment, and the documents are associated with the shipment pending pick-up by the selected carrier. The documents printed by the shipment manager include manifests, airbills, etc. The shipment manager also creates, updates and maintains a customer database and other records of past shipments.

The present invention is related to the use of computer 2 to install software components in a target system according to a profile. According to one embodiment, importing information from a network is performed by computer 2 in response to CPU 155 executing sequences of instructions contained in memory 160, 165. Such instructiong may be read into the memory from another computer-readable medium, such as data storage devices 171, 172, 173. Alternatively, the instructions are downloaded from the Web server 60 through the Internet 50 and the modem 190 or the communications port 185. The instructions are requested by running a browser program on the computer 2 and commanding the browser to retrieve instructions located at a specified address or universal resource locator (URL) of a document on the Internet 50. A URL is a network address or a reference to a remote World Wide Web server 60 or website. The downloaded instructions are stored in one of the data storage devices 171, 172, 173 and are then loaded into the memory 160, 165. Execution of the sequences of instructions contained in the memory causes CPU 155 to perform the process steps that will be described hereafter. In alternative embodiments, hard-wired circuitry may be used in place of or in combination with software instructions to implement the present invention. Thus, the present invention is not limited to any specific combination of hardware circuitry and software.

Figure 2A:
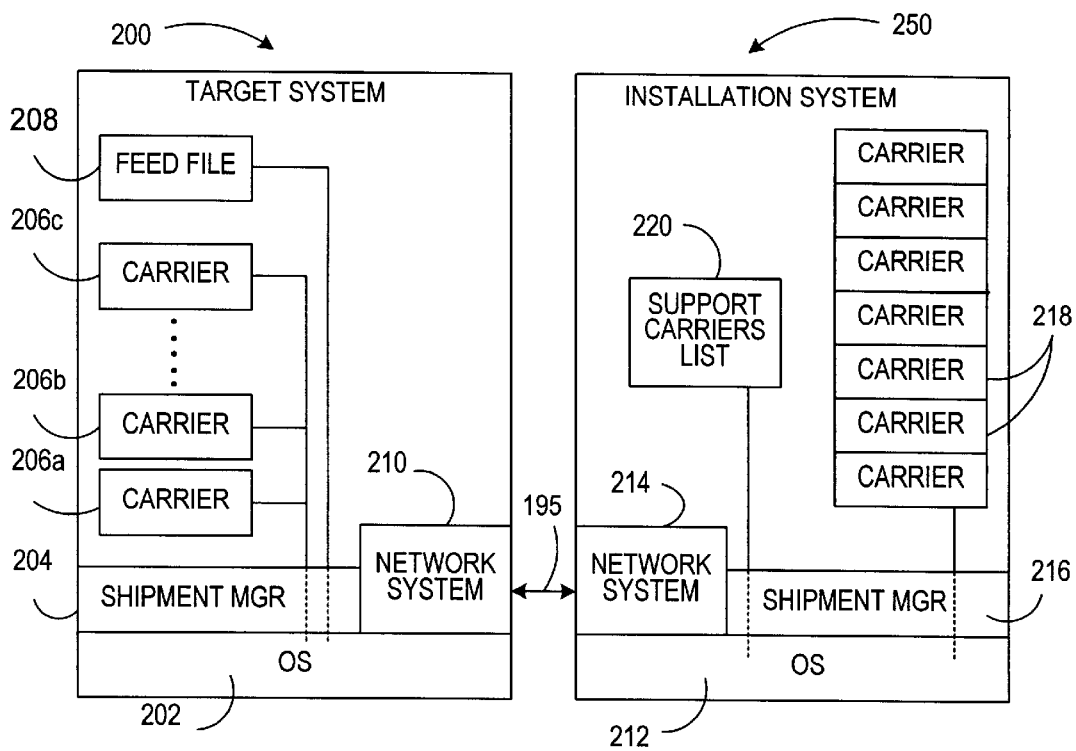
FIG. 2A is a block diagram of a software architecture of one embodiment of the invention.

FIG. 2A is a block diagram of a software architecture with which an embodiment of the present invention can be implemented. In one embodiment, a target computer system 200 communicates with an installation computer system 250. Generally, the installation system 250 contains software components, a subset of which are to be installed in the target system 200 according to a profile of the target system that is stored in the target system. In this embodiment, the target system 200 and the installation system 250 each have the general hardware configuration of computer 2 shown in FIG. 1A.

Operating systems (OS) 202, 212 are installed in the central processing unit 155 of the target system 200 and the installation system 250, respectively, such as on the hard drive 172 of each. In conventional manner, the OS 202, 212 is loaded by the CPU 155 into the main memory when the computer is powered up. The OS 202, 212 controls and supervises the operation of one or more application software programs, and facilitates interaction of the application programs with functions of the OS 202, 212 and of the hardware elements of the target system 200 and installation system 250.

In the embodiment of FIG. 2A, the shipment manager 204 is a software program for managing shipments by the shipper, and is installed in the target system 200 and runs on top of OS 202. Thus, the shipment manager 204 is an example of an application program that is loaded from a non-volatile storage device, or downloaded from the network 195, into the memory of the target system 200. Application programs run on a computer 2, for example, by residing in the main memory (160, 165) or in the data storage devices 171, 172, 173, for execution by the CPU 155.

A network system 210 also runs under control of OS 202. The network system 210 enables the target system 200 to communicate data and instructions over the network 195 to a compatible network system 214 that runs under control of OS 212 in the installation system 250. For example, in one embodiment, the network systems 210, 214 are Novell NetWare software or the equivalent, and the network 195 is an Ethernet local area network (LAN). In this way, the installation system can rapidly communicate files of data and program instructions from the installation system to the target system.

The shipment manager 204 controls, reads and writes a feed file 208 that is stored in one of the storage devices 171, 172, 173 of the target system 200. The feed file stores a list of product control numbers (PCNs), each of which uniquely identifies a software component that is needed by the shipment manager 204. In one embodiment, each of the PCNs identifies one of the common carriers with which the shipper contracts to carry packages from the shipper to a destination. Each of the PCNs is uniquely associated with a carrier file 206a, 206b, 206c that contains information about the carrier. Exemplary PCNs and corresponding carriers are shown in Table 1.

TABLE 1

PCNs AND CARRIERS

| PCN | CARRIER |
|---|---|
| T235 | CONSOLIDATED FREIGHT |
| T237 | ROADWAY EXPRESS |
| T238 | UNITED PARCEL SERVICE |
| T240 | DHL |

The format used for PCNs is not critical provided that each PCN uniquely identifies one carrier. The feed file 208 may be organized in any convenient data processing format, such as a sequentially read text file having fixed length or variable length records.

PCNs also refer to software components other than carrier files. For example, a PCN can identify a special bar code printing module that is needed by the shipper, and that is selectively loaded by the shipment manager 204 when needed in processing shipments. Thus, each of the PCNs identifies a different software component that characterizes the target system 200. In this way, the feed file 208 is a profile of the target system 200. As described herein, the installation system 250 can configure the target system 200 by reading the feed file 208.

In FIG. 2A, three carrier files 206a, 206b, 206c are shown by way of example. However, the target system 200 may comprise any number of carrier files depending on the needs of users of the target system 200.

In one embodiment, the OS 202 is Microsoft Windows, and each of the carrier files 206, 206b, 206c is called a Carrier DLL and is implemented in the form of a Dynamically Linked Library (DLL) compatible with the Microsoft Windows operating system. Each carrier file contains a price schedule for the carrier, as well as a sequence of program instructions that implement computational algorithms relating to shipments.

For example, the carrier file 206a contains rules that define an "oversize" package for the carrier associated with the carrier file 206a. When the shipper commands the shipment manager 204 to process a shipment of a package for that carrier, the shipper enters the "characteristics" of the package into the main memory in response to prompts generated by the shipment manager 204. The shipment manager 204 reads the carrier name and associates it with the carrier file 206a. The shipment manager 204 dynamically loads the carrier file 206a into main memory. The shipment manager 204 assembles the package by characteristic, includes weight, destination, etc. values, and calls a method or procedure in the carrier file that computes shipping charges. The procedure in the carrier file 206a provides a result to the shipment manager 204, which carries on further processing according to the value of the result.

The installation system 250 has a software program called a carrier manager 216 that runs under control of the OS 212. The carrier manager 216 is used in the installation system 250 to compute shipping results based on the carrier files installed on the system.

The supported carriers list file 220 stores a master list of PCNs that identify all carriers known to the installation system 250. Each of the PCNs in the supported carriers list file is uniquely associated with a set of carrier files 218. Thus, the installation system 250 stores all the carrier files that are possible to install in a target system 200.

The data format of records in the supported carriers list file 220 is shown in Table 2:

TABLE 2

FORMAT - SUPPORTED CARRIERS LIST FILE

| FIELD | TYPE | CONTENTS |
|---|---|---|
| PCN | 4 character alphanumeric | PCN for matching to feed file, e.g., "T255" |
| PCN | 4 character alphanumeric | PCN for matching to feed file, e.g., "T255" |
| Carrier Token | 4 character alpha | Identifying token used by Carrier Manager, e.g., "WWAT" |
| NMF | 4 character alpha | National Motor Freight alphabetic code, e.g., "WWAT" |
| Data type | DAS or MINN | Type of data in Rating DLL |
| File name | 12 char alpha | File name of Rating DLL for this carrier, e.g., "wwat.dll" |
| FileSet name | 12 char alpha | String with wildcard characters that identifies the set of data files that correspond to this carrier, e.g. "wat*.*" |
| Data Size | Integer, 8 digits | Size in bytes of data files |
| Name | Variable length alpha | Name of carrier (e.g., "Watkins Motor Lines") and comments about carrier |

The data format of each record in FEED FILE is shown in Table 3:

TABLE 3

FORMAT - FEED FILE

| FIELD | TYPE | CONTENT |
|---|---|---|
| Record Type | 3 Character Alpha | Description |
| Agreement | 7 Alpha | Agreement Number |
| Feature | 10 Alpha | Feature Name |
| Sequence | 3 Alpha | Sequence Number |
| PCNVER | 3 Alpha | PCN Version Number |
| BUILDRATE | 1 Alpha | Build Rate Flag |
| MFG No. | 1 Alpha | Manufacturing Number |
| ORIGINZIP | 9 Alpha | Originating Zip Code |
| PARTNO | 10 Alpha | PCN Part Number |
| SHIPDATE | 8 Alpha | Shipment Date |
| MFGDATE | 8 Alpha | Manufacturing Date |
| APPROVAL NO. | 8 Alpha | Approval Number |
| AUTO-REP | 1 Alpha | Auto-Replace Flag |
| STATECODE | 2 Alpha | State Code |
| PARTREV | 3 Alpha | Part Revision Number |

The carrier manager 216 includes an installation process in the form of a sequence of program instructions which, when executed by a processor in the installation system 250, cause the processor to install one or more of the carrier files 218 into the target system 200.

Generally, before this process is carried out, a customer such as a shipper orders the target system 200 and specifies the identity of the carriers that the shipper plans to use in the shipper's business. The price of the target system 200 may be determined in part by the number or identity of the carriers. Each carrier requested by the shipper is associated with a PCN. The feed file 208 is created and stored in the target system 200, and each PCN associated with a carrier requested by the shipper is written into the feed file 208. Other PCNs associated with other software components requested by the carrier also may be written into the feed file 208. The feed file 208 is then ready for use.

To accomplish installation of the carrier files 206a, 209b, 206c, the target system 200 is connected to the network 195, as is the installation system 250. Therefore, application programs running in the installation system 250 can access files stored in the target system 200 through the file system that is integral to the network system 210, 214.

A user of the installation system 250 activates the installation process. When the installation process is in operation, it reads PCNs sequentially from the feed file 208. Each PCN is compared to the PCNs in the supported carriers list file 220. If the PCN read from the feed file 208 matches a PCN in the supported carriers list, then the installation process reads the identity of the carrier files 218 that is associated with the PCN. The carrier files selected are those identified in the "File Name" and "File Set Name" fields of the Supported Carrier List File. The selected carrier files 218 are then installed in the target system 200. For example, the selected carrier files 218 are copied from the installation system 250 over the network 195 to the hard disk 171 of the target system 200.

The installation process then tests whether the feed file 208 has other PCNs. If so, the remaining PCNs are read and processed in the same manner.

When all PCNs have been read and processed, in the preferred embodiment the installation process writes, in a system registry of the target system 200, a description of the subset of the carrier files 218 that were installed into the target system 200. The system registry is a file maintained by the Windows95 and Windows NT operating systems that is reserved for internal use by application programs. Use of the system registry is advantageous because it is static to each target machine. The system registry is also flexible; for example, a file name written in the system registry can identify a local directory path or a network directory path, so that carrier manager configuration information can be redirected to a network if the target system is connected to one.

Use of the system registry is merely exemplary. Alternatively, a description of the installed carrier files can be written into any system file or other storage area that provides a dedicated, known location that is convenient for storing configuration information needed by the carrier manager 216.

Figure 4:
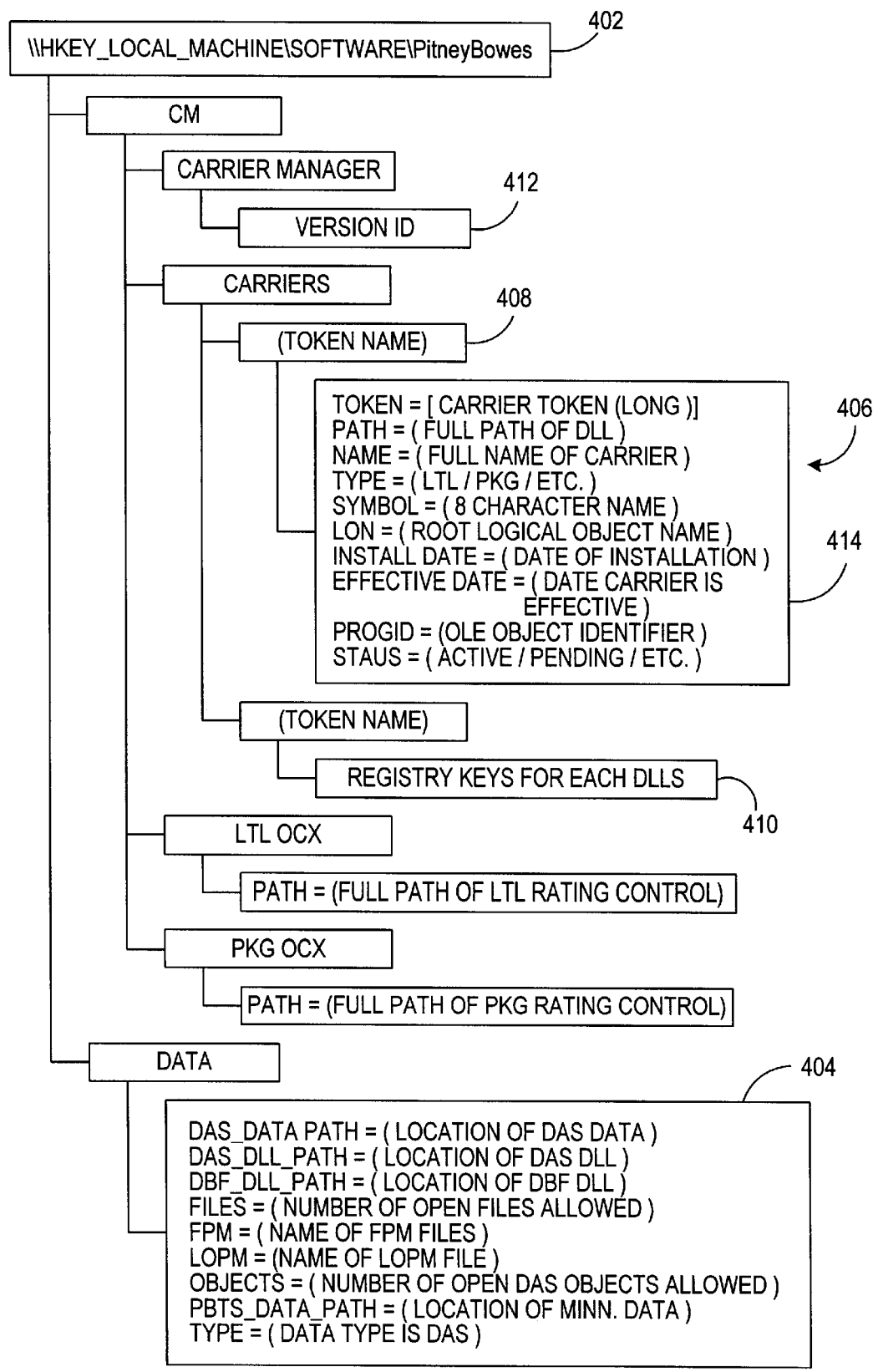
FIG. 4 is a block diagram of data stored in a system registry by the invention.

An example system registry layout is shown in FIG. 4. Preferably, the installation process writes a category header 402 in the system registry, such as "PitneyBowes", and then writes information about the carriers and carrier files within the PitneyBowes category. For example, in the system registry the installation process writes carrier management information 404 and carrier-specific information 406. The carrier-specific information 406 comprises one or more tokens 408. Each token 408 uniquely identifies a carrier and has the format set forth in Table 2 above. For each token, the carrier-specific information 406 comprises data values 414 representing a long form of the token; the location of the DLL associated with the carrier; the name of the carrier; the type of carrier (e.g., package, less than lot); the date the carrier file was installed and became effective, and its status. Registry keys 410 for each DLL are also stored in association with tokens. The carrier management information 404 comprises data values representing the location of administrative data, the number of open files allowed to be used by the system, and other management information.

Thus, the installation process provides a way to store in the target system a list of all the carriers installed in the target system that are available for use with the shipment manager 204.

The installation process is then complete. The installation system 250 installs, from among all the carrier files 218, only those carrier files that are needed by the target system 200. The installation is done according to a profile of the target system 200 provided in the feed file 208.

Figure 2B:
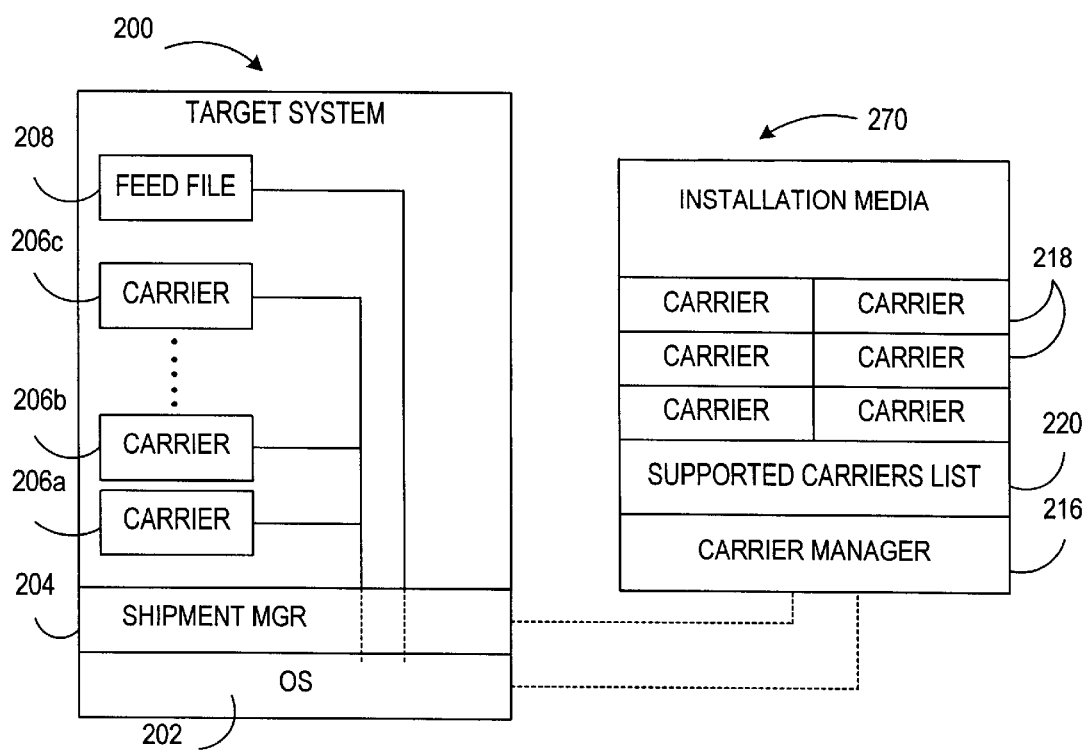
FIG. 2B is a block diagram of a software architecture of an alternate embodiment of the invention.

FIG. 2B is a block diagram of an alternate embodiment of the invention. In this embodiment, the carrier manager 216, supported carriers list 220, and carrier files 218 are stored in association with one another on installation media 270. For example, the installation media 270 is a CD-ROM disk that contains files of program instructions and data that represent the carrier manager 216, supported carriers list 220, and carrier files 218. To initiate the installation process, the installation media 270 is mounted on one of the storage devices 171, 172, 173 of the target system 200. A user commands the OS 202 to load and run the carrier manager 216 and an installation process of the carrier manager 216. The OS 202 reads the storage device and loads the carrier manager 216 from the installation media 270 into the main memory of the target system 200. The OS 202 transfers program control to the carrier manager 216, which executes in the target system 200.

The carrier manager 216 then reads PCNs sequentially from the feed file 208. Each PCN is compared to the PCNs in the supported carriers list file 220. To do this, the carrier manager 216 reload the supported carriers list file 220 from the installation media 270, assisted by file system routines integral to the OS 202. If the PCN read from the feed file 208 matches a PCN in the supported carriers list, then the installation process reads the identity of one of the carrier files 218 that is associated with the PCN. The selected carrier file 218 is then installed in the target system 200. For example, using the file system routines of the OS 202, the selected carrier file 218 is copied from the installation media 270 to the hard disk 171 of the target system 200.

The installation process then tests whether the feed file 208 has other PCNs. If so, the remaining PCNs are read and processed in the same manner. Preferably, the system registry is written in the manner described above in connection with FIG. 2A.

Another alternate embodiment has the general structure of FIG. 2A, modified so that the installation system 250 is a Web server, and the installation process is carried out over the data network 195 using World Wide Web protocols. In this embodiment, the target system 200 has a communications program that enables the OS 200 and other application programs to connect to the data network 195 or the telephone network 191. For example, under control of the OS 200 or an application program, the communications program commands the modem 190 to take a telephone line connected to the modem 190 off-hook, wait for dial tone, and place a telephone call to an ISP. The communications program establishes a connection with the ISP. When an application program writes data to the communications port 185 or to the modem 190, the communications program converts the data to a form usable by the modem or the port. Exemplary commercially available communications programs are ProCOMM, and the Terminal program of Microsoft Windows 3.11. When Microsoft Windows95 is used as the OS 202, the communications program is integrated with the OS 202.

In this embodiment, the target system 200 also runs a browser program on top of the OS 202. The browser reads a document prepared in HTML that is stored on the hard disk 172 of the installation system 250, interprets the HTML tags contained in the document, and displays graphics, text, and other elements encoded in the document on the display 120.

The browser may obtain a document from the installation system 250 by establishing an HTTP connection through the communications program 202 to the installation system 250.

Configured as a Web server, the installation system 250 runs a Web server program, under control of the OS 212, which uses the HTTP protocol to respond to the browser. The installation system 250 stores documents such as HTML format documents or Web pages in one of the storage devices 171, 172, 173 coupled to the installation system. To obtain a document from the installation system 250, the browser issues a request in the HTTP protocol, such as an HTTP GET command, with the name of the desired document as an argument to the command. In response, the installation system 250 searches its storage devices for the requested document. If it is found, the installation system 250 loads the document and delivers it over the HTTP connection to the browser. The HTTP connection is then disconnected.

In known manner, the installation system 250 can also deliver data files or program files, rather than HTML documents, over the network 195 in response to requests from the browser.

In this embodiment, the carrier manager 216 is implemented as a Java applet or an ActiveX control, and the browser can download Java applets or ActiveX controls that are embedded in Web pages received by the browser, and execute the applets or controls locally in a protected memory area of the target system 200. To execute the installation process, a user of the target system 200 uses the browser to establish an HTTP connection to a home HTML page stored at a pre-defined, known location in the installation system 250. Operating as a Web server, the installation system 250 delivers the home page to the browser. The home page is tagged to identify the carrier manager 216 as a Java applet. The Java applet is delivered with the Web page to the browser, and the browser executes the carrier manager 216 in the target system as an applet. The carrier manager 216 reads the feed file 208, matches PCNs in the feed file 208 to PCNs in the supported carriers list 220, and installs master carrier files 218 that match the PCNs in the target system in the manner described above in connection with FIG. 2A.

This embodiment is advantageous for providing updates to the carrier files 206a, 206b, 206c after the target system 200 is delivered to the customer. The customer can remotely connect the target system 200 to the installation system 250 and obtain only those carrier files that are needed by the shipment manager 204, or only those carrier files for which the customer has paid. This embodiment is also advantageous to upgrade an existing customer target system when the customer does not wish to ship the target system to the manufacturer for configuration.

Yet another alternate embodiment has the general structure shown in FIG. 2A, except that the feed file 208 is stored in the installation system. Still another alternate embodiment has the general structure shown in FIG. 2A, except that the feed file 208 is stored on an external medium, such as a disk, that is loaded into the installation system before the installation process is initiated. The installation system then reads the feed file from the external medium during the installation process.

In the embodiments described herein, the installation media 270 and the installation system 250 broadly are conceived to be a source from which a software system is installed into a target system. Thus, the invention encompasses methods, apparatus and products for installing a software system from a source to a target system according to a profile of the software system.

Figure 3A:
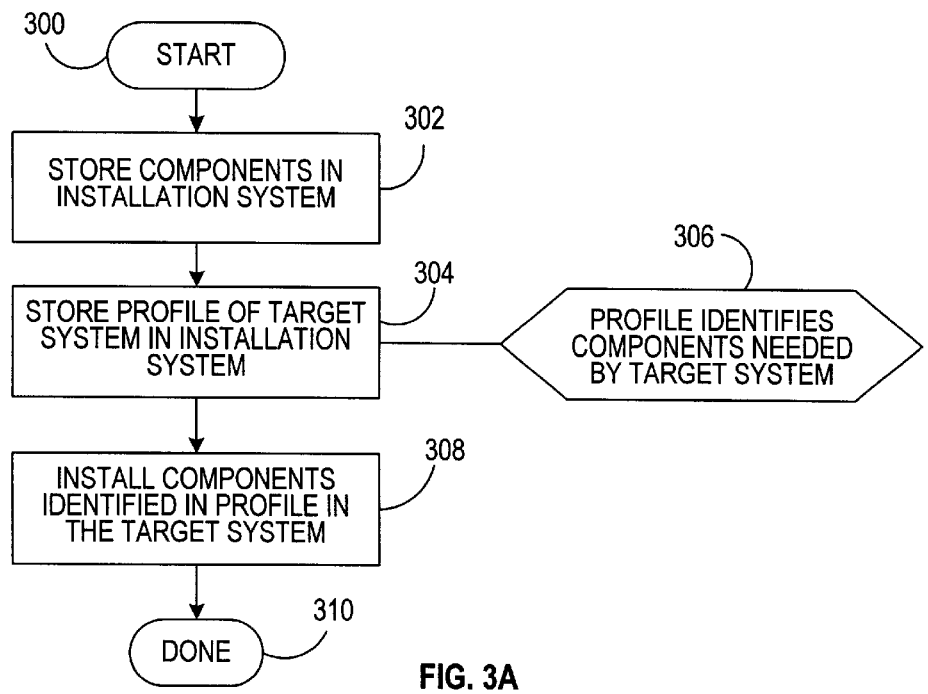
FIG. 3A is a flowchart of a method according to one embodiment of the invention.
Figure 3B:
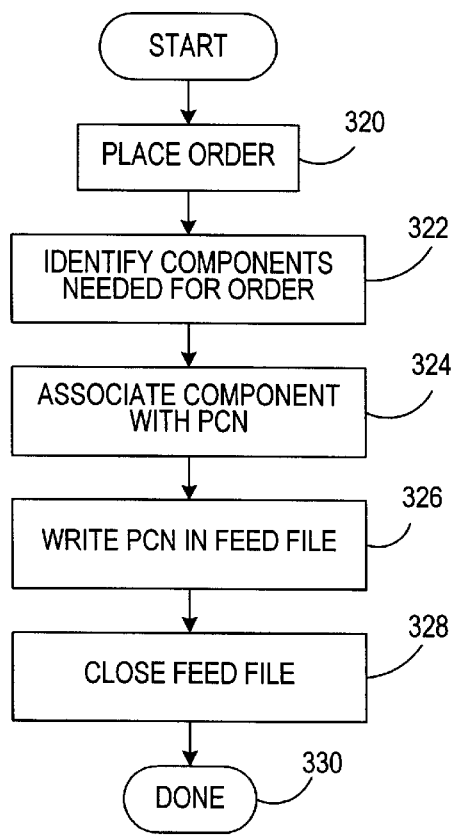
FIG. 3B is a flowchart of preparatory steps for a method according to an alternate embodiment of the invention.

The invention also encompasses certain data processing methods. In one embodiment, a method of installing software components in a target system according to a profile has the steps shown in FIG. 3A. After initiation in step 300, the process stores the components in an installation system, as shown in step 302. In step 304, a profile of the target system is stored in the installation system. Preferably, as shown in step 306, the profile identifies components of a software system that are needed by the target system to carry out a desired function or to complete its configuration. In step 308, the components identified in the profile are installed in the target system. The process is complete at step 310.

Figure 3C:
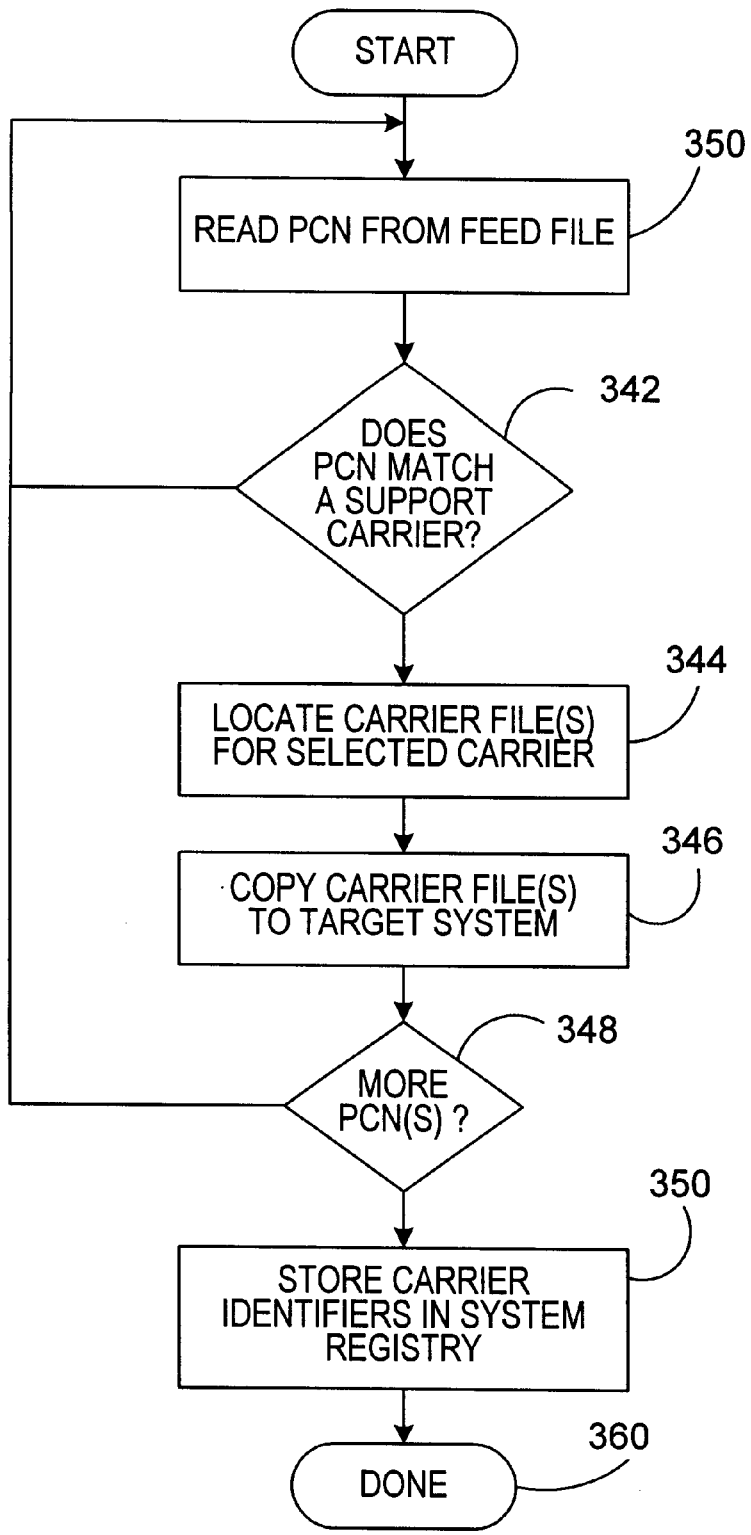
FIG. 3C is a flowchart of a method according to an alternate embodiment of the invention.

In another embodiment, a method has the steps shown in FIG. 3C. For context and background, FIG. 29 shows preparatory steps that preferably precede the process of FIG. 3C. In step 320, a shipper or other customer places an order for a target system. The components needed to configure the target system according to the customer's order are identified in step 322. In step 324, each of the components is associated with a unique, pre-defined identifier such as a product control number or part number. In step 326, each of the PCNs is written to a feed file. In step 328, the feed file is closed. The preparatory steps are completed at step 330.

Referring now to FIG. 3C, a method of the invention is initiated by reading a PCN from the feed file in step 340. In step 342, the PCN read from the feed file is tested, to determine whether it matches a PCN that identifies a supported carrier listed in a supported carrier list. If not, control returns to step 340 to read the next PCN in the feed file.

If a match is found, then in step 344 one or more carrier files associated with the PCN and the selected carrier are located in an installation system or installation media. In step 346, the carrier files corresponding to the PCN are installed in the target system, for example, by copying the carrier files from the installation media or the installation system to the target system.

In step 348, the process tests whether more PCNs are found in the feed file. If so, control is passed to step 340 so that remaining PCNs can be processed in the manner described above according to steps 340 to 348, If there are no more PCNs to be read from the feed file, then in step 350 information identifying the carriers is stored in a system registry of the target system. The process then concludes at step 360.

The installation process may be implemented as an install script written in a scripting language, or as a compiled or interpreted program, and in other ways. Thus, a method of installing software components in a target system, according to a profile of the target system, has been described. The invention provides a way to fulfill a product order based on a product configuration listed in a profile created during the order placement process that contains specific information about the components that must be delivered to complete the order. The installation process automatically configures the product by reading the contents of the profile and installing needed components, so that the product delivered to the customer contains only the software components and data ordered by the customer.

The invention also encompasses a computer program product configured to carry out the processing steps described herein. The computer program product is embodied in a memory medium such as a floppy disk, CD ROM, hard disk, magnetic tape, or Digital Video Disk compatible with the drives 171, 172, 173 of FIG. 1B. The memory media contain program information for controlling the computer shown in FIG. 1A and FIG. 1B to enable the computer to perform functions and processes according to the invention. The memory media also contain program information for establishing in the main memory of the computer the software architecture of the invention shown in the drawing figures, and the alternative software architecture embodiments discussed herein.

While certain embodiments have been described above in terms of managing shipments of packages by carriers, the invention is not limited to such a context. A shipment is one example of a transaction context for the invention, and the carriers and related carrier files are intended merely to exemplify the type of information and software components that can be used with the invention. The invention is intended to be applicable broadly to installing components of a software system in a target system according to a profile of the target system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of installing a software system in a target system from a source that stores a plurality of software components of said software system, comprising the steps of:
   (a) storing a profile of said target system, wherein said profile defines a subset of said software components that are needed by said target system; and
   (b) installing, from said source to said target system, only said subset of said software components defined in said profile.

2. The method recited in claim 1, wherein said source is a computer readable medium.

3. The method recited in claim 1, wherein said source is an installation system.

4. The method recited in claim 3, wherein said step of installing further comprises the step of communicating said subset from said installation system to said target system over a network.

5. The method recited in claim 3, wherein the step of storing a subset of the plurality of software components comprises the step of storing in said installation system a plurality of carrier files, wherein each of said carrier files defines shipment parameters for one of a plurality of carriers.

6. The method recited in claim 5, wherein the step of storing a profile of said target system comprises the step of storing in said installation system a feed file comprising at least one product control number, wherein each one of said product control numbers identifies one of said carrier files.

7. The method recited in claim 6, wherein said step of installing further comprises the steps of:
   (a) reading a selected product control number from said feed file; identifying one of said carrier files identified by said selected product control number; and
   (b) copying from said installation system to said target system said one of said carrier files that is identified by said selected product control number.

8. The method recited in claim 7, further comprising the step of storing in said installation system a supported carrier list comprising a plurality of supported carrier identifiers.

9. The method recited in claim 8, wherein the step of identifying one of said carrier files includes the step of testing whether said selected product control number matches one of said supported carrier identifiers.

10. The method recited in claim 5, wherein each of said carrier files comprises a rating DLL.

11. The method recited in claim 5, wherein said step of installing further comprises the step of writing information identifying one of said carriers in a system registry of said target system.

12. A method of installing a software product in a target computer from a source that stores a plurality of components of said software product, comprising the steps of:
   (a) storing a feed file comprising a product control number that uniquely identifies one of said components needed by said target system, and a supported carrier list comprising at least one supported carrier identifier that uniquely identifies a carrier;
   (b) reading said product control number from said feed file and
   (c) when said product control number matches said supported carrier identifier, installing from said source to said target computer, only the one of said plurality of components identified in said feed file and identified by said product control number.

13. Computer apparatus for installing a software system in a target computer, said apparatus comprising:
   (a) a processor; and
   (b) a storage medium coupled to said processor and having stored therein a plurality of software components of said software system, in which said processor is configured to store a profile of a target system, wherein said profile defines a subset of said software components that are needed by said target system; and installing, from said storage medium to said target system, only said subset of said software components defined in said profile.

14. The apparatus recited in claim 13, wherein said storage medium is a disk.

15. The apparatus recited in claim 13, wherein said storage medium is an installation system.

16. The apparatus recited in claim 15, wherein said processor further is configured to communicate said subset from said installation system to said target system over a network.

17. The apparatus recited in claim 15, wherein said processor further is configured to store in said installation system a plurality of carrier files, wherein each of said carrier files defines shipment parameters for one of a plurality of carriers.

18. The apparatus recited in claim 17, wherein said processor further is configured to store in said installation system a feed file comprising at least one product control number, wherein each of said product control numbers identifies one of said carrier files.

19. The apparatus recited in claim 18, wherein said processor further is configured to:
   (a) read a selected product control number from said feed file;
   (b) identify one of said carrier files identified by said selected product control number; and
   (c) copy from said installation system to said target system said one of said carrier files that is identified by said selected product control number.

20. The apparatus recited in claim 19, said processor further is configured to store in said installation system a supported carrier list comprising a plurality of supported carrier identifiers.

21. The apparatus recited in claim 20, said processor further is configured to test whether said selected product control number matches one of said supported carrier identifiers.

22. The apparatus recited in claim 17, wherein each of said carrier files comprises a rating DLL.

23. The apparatus recited in claim 17, wherein said processor further is configured to write information identifying one of said plurality of carriers in a system registry of said target system.

24. A computer software product that includes a medium readable by a processor, the medium having stored thereon a sequence of instructions which, when executed by said processor, causes said processor to install a software system from a source that stores a plurality of software components of said software system to a target system by causing said processor to execute the steps of:
   (a) storing a profile of said target system, wherein said profile defines a subset of said software components that are needed by said target system; and
   (b) installing, from said source to said target system, only said subset of said software components defined in said profile.

25. The software product recited in claim 24, wherein said source is an installation system.

26. The software product recited in claim 25, wherein said sequence of instructions further causes said processor to carry out the step of communicating said subset from said installation system to said target system over a network.

27. The software product recited in claim 25, wherein said sequence of instructions further causes said processor to carry out the step of storing in said installation system a plurality of carrier files, wherein each of said carrier files defines shipment parameters for one of a plurality of carriers.

28. The software product recited in claim 27, wherein each of said carrier files comprises a rating DLL.

29. The software product recited in claim 27, wherein said step of installing further comprises the step of writing information identifying one of said carriers in a system registry of said target system.

30. The software product recited in claim 25, wherein said sequence of instructions further causes said processor to carry out the step of storing in said installation system a feed file comprising at least one product control number, wherein each one of said product control numbers uniquely identifies one of said carrier files.

31. The software product recited in claim 30, wherein said sequence of instructions further causes said processor to carry out the steps of:
   (a) reading a selected product control number from said feed file;
   (b) identifying one of said carrier files identified by said selected product control number; and
   (c) copying from said installation system to said target system said one of said carrier files that is identified by said selected product control number.

32. The software product recited in claim 31, said sequence of instructions further causes said processor to carry out the step of storing in said installation system a supported carrier list comprising a plurality of supported carrier identifiers.

33. The software product recited in claim 32, said sequence of instructions further causes said processor to carry out the step of testing whether said selected product control number matches one of said supported carrier identifiers.

* * * * *

UNITED STATES PATENT AND TRADEMARK OFFICE
CERTIFICATE OF CORRECTION

PATENT NO.    : 6,301,707 B1
DATED         : October 9, 2001
INVENTOR(S)   : Carroll et al.

It is certified that error appears in the above-identified patent and that said Letters Patent is hereby corrected as shown below:

Column 13,
Line 31, after "profile", insert -- , said subset of said software components including at least one file associated with a shipping carrier, said at least one file defining shipment parameters for said shipping carrier --.
Line 41, after "storing a" insert -- profile that defines a --.
Line 41, delete "plurality of".
Line 42, before "comprises", insert -- further --.
Line 43, before "carrier" (first and second occurrence), insert -- shipping --.
Line 44, after "parameters for", insert -- a respective --.
Line 44, before "plurality", delete "a", substitute -- said --.
Lines 44-45, before "carriers", insert -- shipping --.
Lines 50, 54, 57, 60, 61, 63, 65 and 67, before "carrier", insert -- shipping --.

Column 14,
Lines 3 and 44, before "carriers", insert -- shipping --.
Lines 10, 11, 12, 16, 42, 43, 49, 54, 57, 61, 62 and 65, before "carrier", insert -- shipping --.
Line 31, after "profile", insert -- , said subset of said software components including at least one file associated with a shipping carrier, said at least one file defining shipment parameters for said shipping carrier --.
Line 35, after "medium", delete "is" and substitute -- includes --.
Line 41, after "configured to", delete "store in said installation", substitute -- install in said target --.
Line 59, before "said processor", insert -- wherein --.
Line 63, before "said processor", insert -- wherein --.

Column 15,
Lines 2, 5 and 33, before "carrier", insert -- shipping --.
Line 19, after "profile", insert -- , said subset of said software components including at least one file associated with a shipping carrier, said at least one file defining shipment parameters for said shipping carrier --.
Line 28, after "installation system", insert -- said profile that defines said subset of software components including --.
Line 29, before "carrier" (first and second occurrence), insert -- shipping --.
Line 30, after "parameters for", insert -- a respective --.
Line 30, before "plurality", delete "a" and substitute -- said --.
Lines 30-31, before "carriers", insert -- shipping --.

UNITED STATES PATENT AND TRADEMARK OFFICE
CERTIFICATE OF CORRECTION

PATENT NO. : 6,301,707 B1
DATED : October 9, 2001
INVENTOR(S) : Carroll et al.

It is certified that error appears in the above-identified patent and that said Letters Patent is hereby corrected as shown below:

Column 16,
Line 3, before "carriers", insert -- shipping --.
Lines 10, 16, 19, 24, 25 and 29, before "carrier", insert -- shipping --.
Lines 21 and 26, before "said", insert -- wherein --.

Signed and Sealed this

Eighth Day of April, 2003

JAMES E. ROGAN
*Director of the United States Patent and Trademark Office*